(12) United States Patent
Drell

(10) Patent No.: US 7,089,285 B1
(45) Date of Patent: Aug. 8, 2006

(54) VIDEOCONFERENCING APPARATUS HAVING INTEGRATED MULTI-POINT CONFERENCE CAPABILITIES

(75) Inventor: David Drell, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 708 days.

(21) Appl. No.: 09/684,145

(22) Filed: Oct. 5, 2000

Related U.S. Application Data

(60) Provisional application No. 60/157,711, filed on Oct. 5, 1999.

(51) Int. Cl.
*G06F 15/16* (2006.01)
*H04N 7/14* (2006.01)

(52) U.S. Cl. ............... 709/204; 348/14.08; 348/14.09

(58) Field of Classification Search ........ 709/204–207; 348/14.01, 14.06–14.16, 552
See application file for complete search history.

(56) References Cited

U.S. PATENT DOCUMENTS

| | | | |
|---|---|---|---|
| 5,491,797 A | | 2/1996 | Thompson et al. |
| 5,506,954 A | * | 4/1996 | Arshi et al. .................. 345/501 |
| 5,784,561 A | * | 7/1998 | Bruno et al. ................. 709/204 |
| 5,914,940 A | * | 6/1999 | Fukuoka et al. ............. 370/263 |
| 5,936,662 A | * | 8/1999 | Kim et al. ................ 348/14.09 |
| 6,025,870 A | * | 2/2000 | Hardy ........................ 348/14.1 |
| 6,072,522 A | * | 6/2000 | Ippolito et al. ............ 348/14.1 |
| 6,073,192 A | * | 6/2000 | Clapp et al. .................. 710/65 |
| 6,124,880 A | * | 9/2000 | Shafiee .................... 348/14.08 |
| 6,269,122 B1 | * | 7/2001 | Prasad et al. .......... 375/240.28 |
| 6,288,739 B1 | * | 9/2001 | Hales et al. .............. 348/14.07 |
| 6,356,294 B1 | * | 3/2002 | Martin et al. ............. 348/14.07 |
| 6,437,818 B1 | * | 8/2002 | Ludwig et al. ........... 348/14.09 |
| 6,453,336 B1 | * | 9/2002 | Beyda et al. ................ 709/204 |
| 6,693,661 B1 | * | 2/2004 | Vanderwilt et al. ...... 348/14.01 |

OTHER PUBLICATIONS

"Portables and Codecs," http://www.tandbergusa.com/produkter/port-codec/pt_6000.html.

* cited by examiner

*Primary Examiner*—Krisna Lim
*Assistant Examiner*—Yasin Barqadle
(74) *Attorney, Agent, or Firm*—Wong, Cabello, Lutsch, Rutherford & Brucculeri, LLP

(57) ABSTRACT

A videoconferencing apparatus includes a multi-point (MP) conference application that enables the apparatus to combine and distribute audio and video signals received from a plurality of remote conference endpoints, thereby obviating the need to provide a separate multi-point control unit having hardware-based inverse multiplexers (IMUXs). The MP conference application is configured to generate, for each remote conference endpoint participating in a conference, discrete instances of a signal processing train by means of dynamically allocable IMUXs, each processing train including a communication process and audio/video/data codecs. The processed audio and video signals are subsequently conveyed to an audio mixer and video switching module for combination with locally-generated audio and video signals. The outputs of the audio mixer and video switching module are sent to each of the plurality of signal processing trains, which process the combined signals according to a transmit mode for distribution to the remote endpoints over the network.

10 Claims, 5 Drawing Sheets

VIDEOCONFERENCING APPARATUS HAVING INTEGRATED MULTI-POINT CONFERENCE CAPABILITIES

CROSS REFERENCE TO RELATED APPLICATIONS

The present invention claims priority from U.S. Provisional Patent Application Ser. No. 60/157,711 filed on Oct. 5, 1999, the entire disclosure of which is incorporated herein by reference.

BACKGROUND OF THE INVENTION

1. Field of the Invention

The present invention relates generally to conferencing systems, and more particularly to a videoconferencing apparatus for use with multi-point conferences.

2. Background of the Prior Art

Videoconferencing systems have become an increasingly popular and valuable business communications tool. These systems facilitate rich and natural communication between persons or groups of persons located remotely from each other, and reduce the need for expensive and time-consuming business travel.

At times, it may be desirable to conduct multi-point conferences, wherein three or more parties (each party consisting of an individual or group located at a particular conference endpoint) participate in the conference. Multi-point conferences are particularly useful in situations where several interested parties need to participate in the resolution of an issue, or where information is to be disseminated on an enterprise-wide level. However, commercially available video conferencing systems are generally capable of communicating with only one other conference endpoint at a time. To conduct multi-point conferences, the conference endpoints are conventionally interconnected through an external piece of equipment called a multi-point control unit (MCU). The MCU is provided with multiple ports for receiving signals representative of audio and video information generated at each of the conference endpoints. The received signals are mixed and/or switched as appropriate, and the mixed/switched signals are subsequently transmitted to each of the conference endpoints.

A significant disadvantage associated with the use of MCUs is their expense. An enterprise wishing to conduct multi-point conferences must either purchase a MCU, which may cost upwards of $50,000, or contract for "video bridge" services through a telephone company, wherein an MCU located at the telephone company's facilities is rented on a fee per unit of usage basis. In either case, the high cost of purchasing or renting an MCU may dissuade a company from conducting multi-point conferences, even when it would be useful to do so.

Conventional MCUs further require a dedicated Inverse Multiplexer (IMUX) for each endpoint of a multi-point conference. These dedicated IMUXs are hardware devices which must be purchased and installed at additional cost to achieve increased endpoint capability.

Finally, conventional MCUs include hard-wired processing units each having a dedicated set of channels associated therewith. Thus, unused channels associated with a processing unit are unavailable for allocation to additional endpoints.

What is therefore needed in the art is a relatively low-cost videoconferencing apparatus which can dynamically allocate unused channels on an as needed basis.

SUMMARY OF THE INVENTION

The present invention is directed to a multi-point (MP) conferencing application having dynamically allocable software-based IMUX functions. The IMUX functions are implemented in a software-based circuit switch operable to aggregate a plurality of processing trains to a wideband serial data stream. The IMUX functions are created on an as needed basis for each endpoint in a multi-point conference.

The MP conferencing application is coupled to a conventional network interface including a time division multiplexer. The time division multiplexer is in turn coupled to a plurality of communication ports, which may typically include ISDN ports, enabling an apparatus including the MP conferencing application to be coupled to two or more remote conference endpoints through a switched network.

The (MP) conferencing application is operable to process the plural signal streams received through the communication ports. Generally, the MP conferencing application generates separate processing trains for signal streams from/to each of the remote conference endpoints. The processing trains each comprise a communication process and a set of codecs. In the receive mode, an IMUX function combines signal streams (representative of a single conference endpoint) distributed over two or more channels into a single, relatively high bandwidth channel. The communication process, which may for example comprise an H.320 process (ISDN-based) or H.323 (packet-based) process, separates the signal stream into audio and video signals, and performs certain processing operations (such as delay compensation) associated therewith. The audio and video signals are thereafter respectively delivered to audio and video codecs for decoding.

The decoded audio and video streams output by each of the processing trains, together with the locally generated audio and video signals, are combined at an audio mixer and a video switching/continuous presence module. The video module may be configured to selectively generate as output video data representative of a composite or continuous presence image, wherein video information (e.g., images of the conference participants) corresponding to each of the conference endpoints is displayed in different sectors of the screen. The combined audio and video data streams are conveyed as input to each processing train for encoding and transmission to the corresponding conference endpoints. In the send mode, the audio and video signals are encoded by the audio/video codecs and multiplexed into a single data stream by the communication process. The combined audio/video data stream is then conveyed to the IMUX function, which distributes the combined audio/video data stream over the channels associated with the selected remote conference endpoint.

DETAILED DESCRIPTION OF PREFERRED EMBODIMENTS

Figure 1:
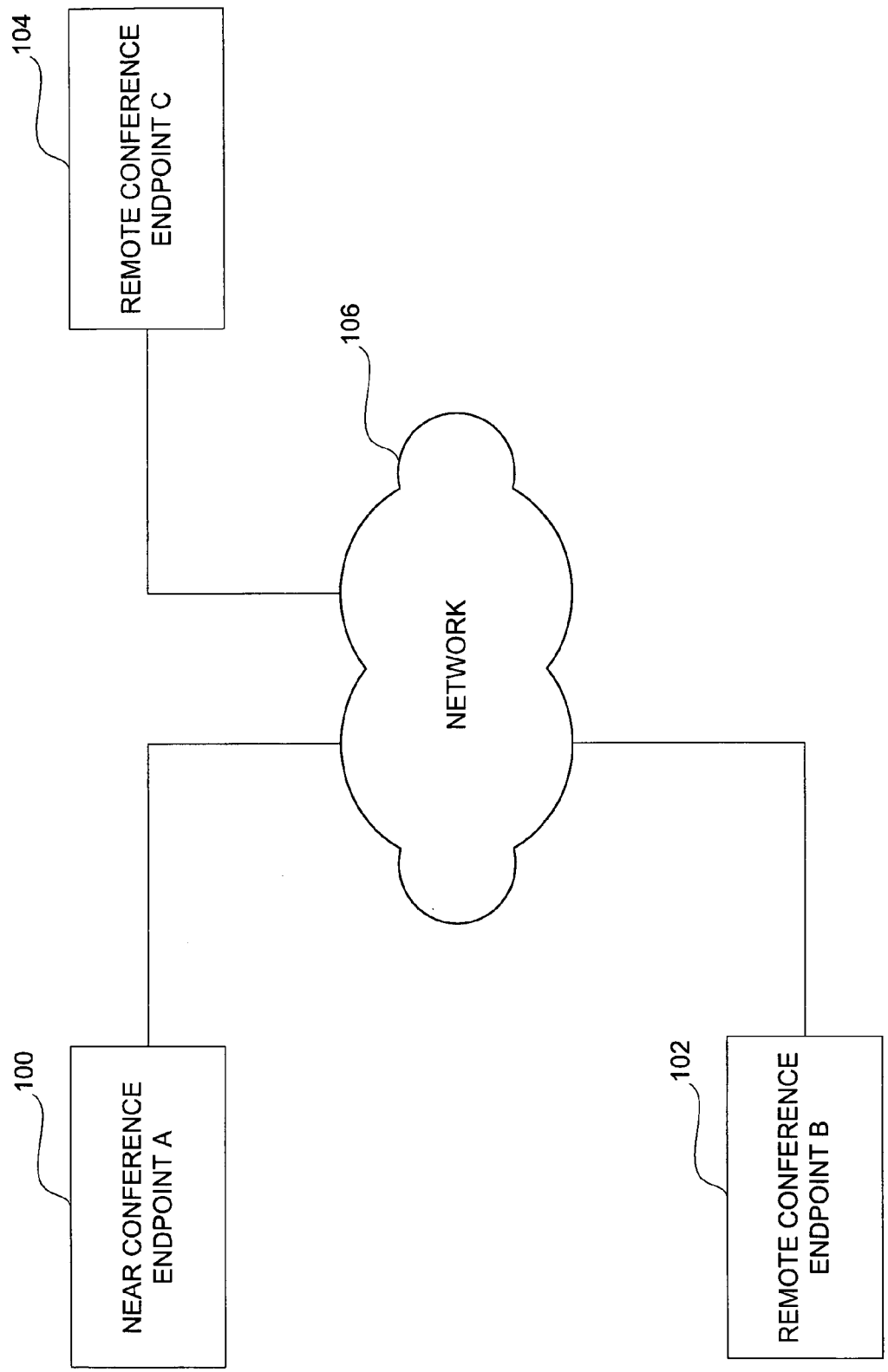
FIG. 1 depicts a near videoconferencing endpoint interconnected with two remote videoconferencing endpoints, the near videoconferencing endpoint having integrated multi-point conferencing capabilities.

FIG. 1 depicts an exemplary operating environment of the multi-point (MP) conferencing application of the present invention. A near conference endpoint 100, embodying the MP conferencing application, is coupled to remote conference endpoints 102 and 104 via a network 106. Remote conference endpoints 102 and 104 may comprise, for example, conventional videoconferencing devices equipped to transmit and receive both video (image) data and audio (speech) data. Alternatively, one or more of remote conference endpoints 102 and 104 may comprise conventional audio conferencing devices limited to reception and transmission of audio data. It should be appreciated that while only two remote conference endpoints are depicted in FIG. 1 for the purpose of clarity, a greater number of remote conference endpoints may be accommodated by near conference endpoint 100.

Network 106 may be of any type suitable for the transmission of audio and video data between and among near conference endpoint 100 and remote conference endpoints 102 and 104. Typically, network 106 will comprise the public switched telephone network (PSTN) or comparable circuit switched network to which each of the conference endpoints is connected by one or more ISDN lines. A multi-point conference is initiated by establishing a connection between near conference endpoint 100 and remote conference endpoint 102, and between near conference endpoint 100 and remote conference endpoint 104. Establishment of the connections may be effected through a dial-up procedure, or through use of a dedicated line.

Alternatively, network 106 may comprise a packet switched network, such as the Internet. Although a single network 106 is shown, the invention contemplates the use of two or more networks (for example, the PSTN and the Internet) to connect conference endpoints utilizing different communication protocols.

Figure 2:
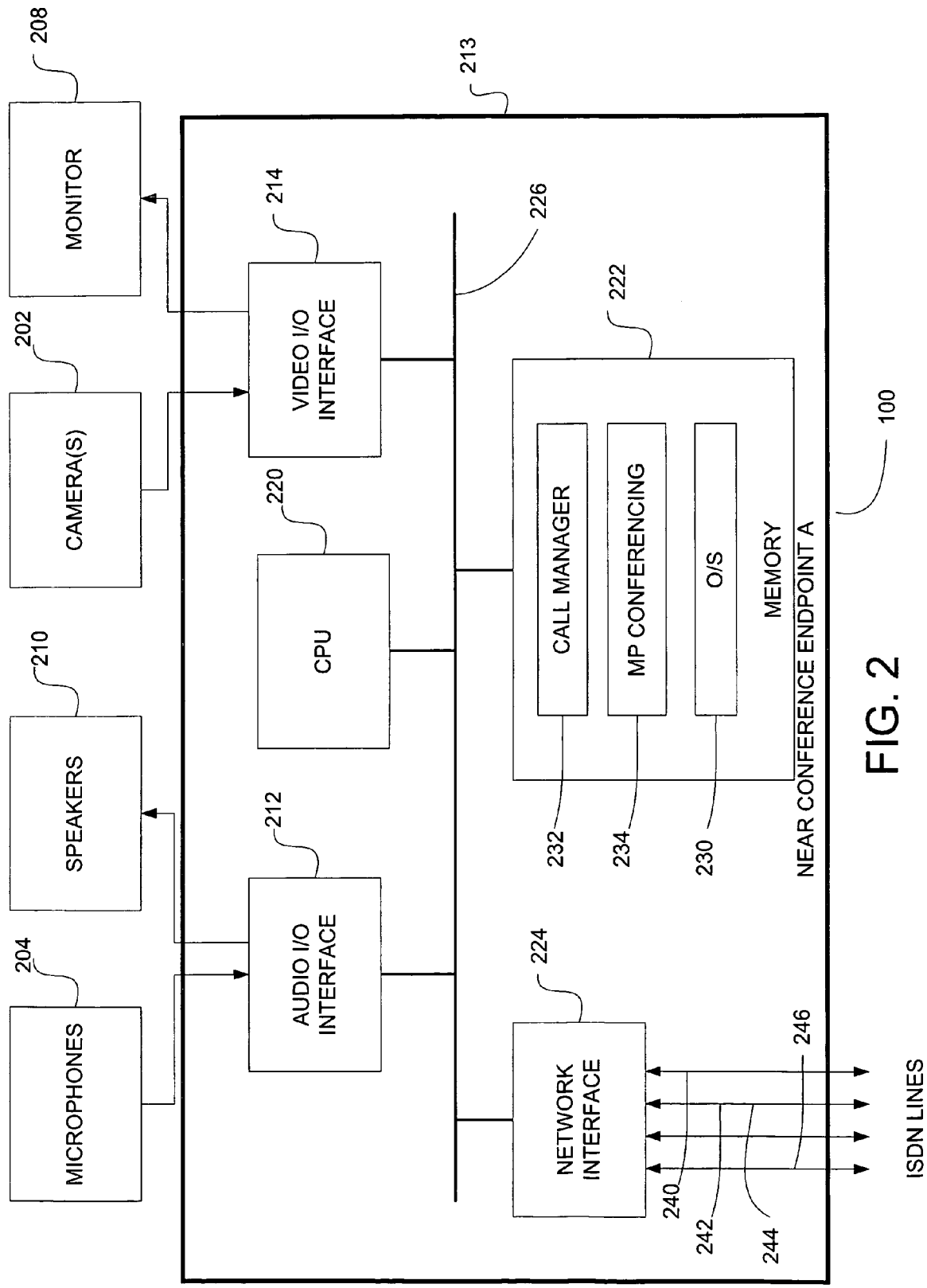
FIG. 2 is a block diagram of the near conferencing endpoint.

Reference is now directed to FIG. 2, which depicts in block form various components of near conference endpoint 100. A conventional video camera 202 and microphone 204 are operative to generate video and audio signals representative of the images and speech of the near conference participant (the person or persons co-located with near videoconference endpoint 100). A video monitor 208 and loudspeaker 210 present images and speech of the remote conference participants combined with locally generated images and speech. An audio I/O interface 212, configured to perform A/D and D/A conversion and related processing of audio signals, couples microphone 204 and loudspeaker 210 to CPU 220 and memory 222 through bus 226. Similarly, video camera 202 and monitor 208 are coupled to console electronics 213 through video I/O interface 214.

Console electronics 213 additionally include a central processing unit (CPU) 220 for executing program instructions, a memory 222 for storing applications, data, and other information, and a network interface 224 for connecting near conference endpoint 100 to network 106. Memory 222 may variously comprise one or a combination of volatile or non-volatile memories, such as random access memory (RAM), read-only memory (ROM), programmable ROM (PROM), or non-volatile storage media such as hard disks or CD-ROMs. At least one bus 226 interconnects the components of console electronics 213.

Network interface 224 is provided with a plurality of ports for physically coupling near conference endpoint 100 to a corresponding plurality of ISDN lines 240–246 or similar transmission media. The number of ports will be determined by the types of connections to network 106, the maximum number of remote conference endpoints which may be accommodated by videoconference endpoint 100, and the required or desired bandwidth per endpoint connection. Depending on bandwidth requirements, data communicated between near conference endpoint 100 and a remote conference endpoint may be carried on a single ISDN line, or may be distributed (for higher bandwidth connections) among a plurality of ISDN lines.

Stored within memory 222 are an operating system 230, a call manager application 232, and the MP conferencing application 234. Operating system 230 controls the allocation and usage of hardware resources, such as CPU 220 and memory 222. Call manager application 232 controls the establishment and termination of connections between near conferencing endpoint 100 and remote conference endpoints 102 and 104, and may also furnish information characterizing the nature of individual connections to MP conferencing application 234.

As will be described in further detail below, MP conferencing application 234 is configured to instantiate a processing train for each remote conference endpoint 102 and 104 to which near conference endpoint 100 is connected. The processing trains process audio and video data streams received from remote conferencing endpoints 102 and 104. The processed audio and video data streams are combined with each other and with locally generated audio and video streams, and the combined audio and video streams are thereafter distributed to remote conferencing endpoints 102 and 104.

Figure 3:
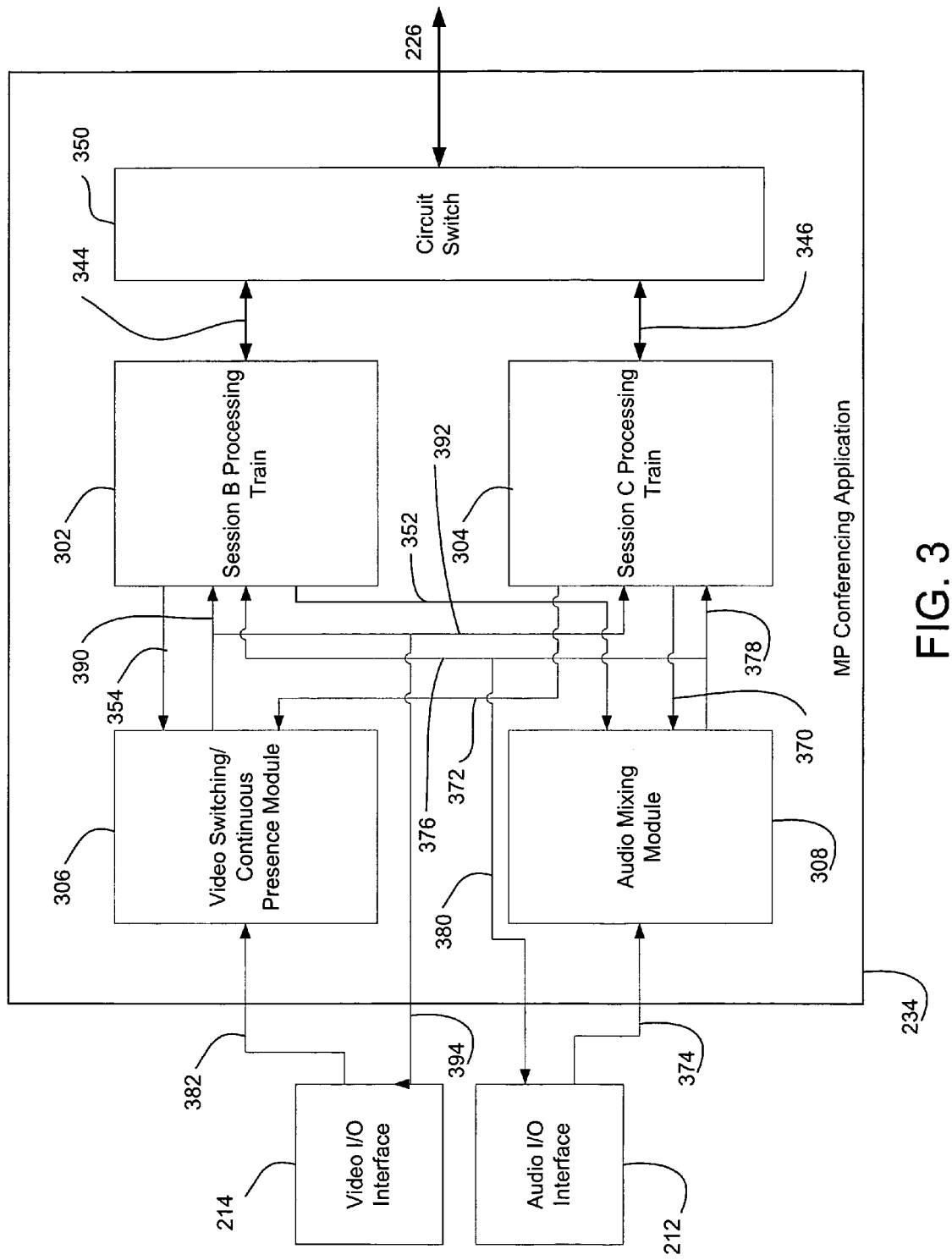
FIG. 3 is a block diagram of a multi-point conferencing application of FIG. 2.

FIG. 3 is a block diagram showing the various components of an embodiment of MP conferencing application 234 and the flow of data between and among the various components. MP conferencing application 234 includes a circuit switch 350, a plurality of processing trains 302 and 304, a video switching/continuous presence module 306, and an audio mixing module 308. The circuit switch 350 dynamically instantiates a number of high bandwidth processing trains equal to the number of remote conference endpoints to which near conference endpoint 100 is connected and preferably includes an dynamically created IMUX allocated to each remote conference endpoint. Each IMUX preferably utilizes a bonding protocol. In the example depicted in the figures, the circuit switch 350 dynamically allocates two IMUXs and generates two processing trains 302 and 304 respectively corresponding to remote conference endpoints 102 and 104.

Processing trains 302 and 304 preferably comprise software routines which process received and transmitted audio and video signals in accordance with predetermined algorithms. In the receive mode, processing train 302 is instantiated by circuit switch 350 to include signals representative of audio and video data transmitted by remote conference endpoint 102. Illustratively, remote conference endpoint 102 may transmit signals on ISDN lines, each ISDN line comprising two distinct 64 Kb/sec bi-directional channels ("Bearer channels"). Those skilled in the art will recognize that a smaller or greater number of ISDN lines may be utilized for communication with remote conference endpoint 102. As will be described in connection with FIG. 4, processing train 302 is operative to extract and decode audio and video data from signals received from remote conference endpoint 102. Decoded audio data is conveyed to audio mixing module 308 over audio data path 352, and decoded video data is conveyed to video switching/continuous presence module 306 over video data path 354.

Processing train 304 similarly receives audio and video data transmitted by remote conference endpoint 104. Processing train 304 extracts and decodes the audio and video data and subsequently passes the decoded audio and video data to audio mixing module 308 and video switching/continuous presence module 306 over audio and video data paths 370 and 372.

Audio mixing module 308 is configured to combine audio data received from remote conference endpoints 102 and 104 with locally generated audio data (received from audio I/O interface 212 via audio data path 374, and typically being representative of the speech of the near conference participant(s)). The term "combine" is used in its broadest and most general sense and is intended to cover any operation wherein audio mixing module 308 generates an output audio data stream (or plurality of output audio data streams) based on information contained in the remotely and locally generated audio data input streams. For example, audio mixing module 308 may simply mix the received audio input data streams, or it may be configured as an audio switch wherein it selects one of the received audio input data streams for output in accordance with predetermined criteria. The output audio data stream is directed to processing trains 302 and 304 and audio I/O interface 212 along output audio paths 376, 378 and 380.

Video switching/continuous presence module 306 combines video data received from remote conference endpoints 102 and 104 with locally generated video data (received from video I/O interface 214 via video data path 382, and being typically representative of images of the near conference participants). Again, the term "combine" is used in its broadest and most general sense. In one mode of operation, video switching/continuous presence module 306 may select one of the video data input streams for output based on predetermined criteria (for example, it may select for output the video data stream corresponding to the conference endpoint of the currently speaking participants. In a second mode of operation (referred to as the "continuous presence mode"), video switching/continuous presence module 306 may construct a composite image wherein images corresponding to conference endpoints are displayed in different sectors of the composite image. The video data stream output (or plurality of outputs) from video switching continuous presence module 306 is thereafter distributed to processing trains 302 and 304 and video I/O interface 214 via video data paths 390, 392 and 394.

In the transmission mode, processing train 302 is configured to receive the audio and video data streams output by audio mixing module 308 and video switching/continuous presence module 306. The received data streams are then encoded and combined to form a mixed encoded audio/video data stream, and the encoded audio/video data stream is transmitted to the circuit switch 350 via data path 344. Similarly, processing train 304 receives the audio and video streams output by audio mixing module 308 and video switching/continuous presence module 306, encodes and combines the audio and video data streams, and transmits the encoded audio/video data stream to the circuit switch 350 via data path 346. For each encoded audio/video data stream, the circuit switch 350 allocates an IMUX which aggregates the data streams into a wideband data stream on the bus 226, preferably utilizing a bonding protocol.

Figure 4:
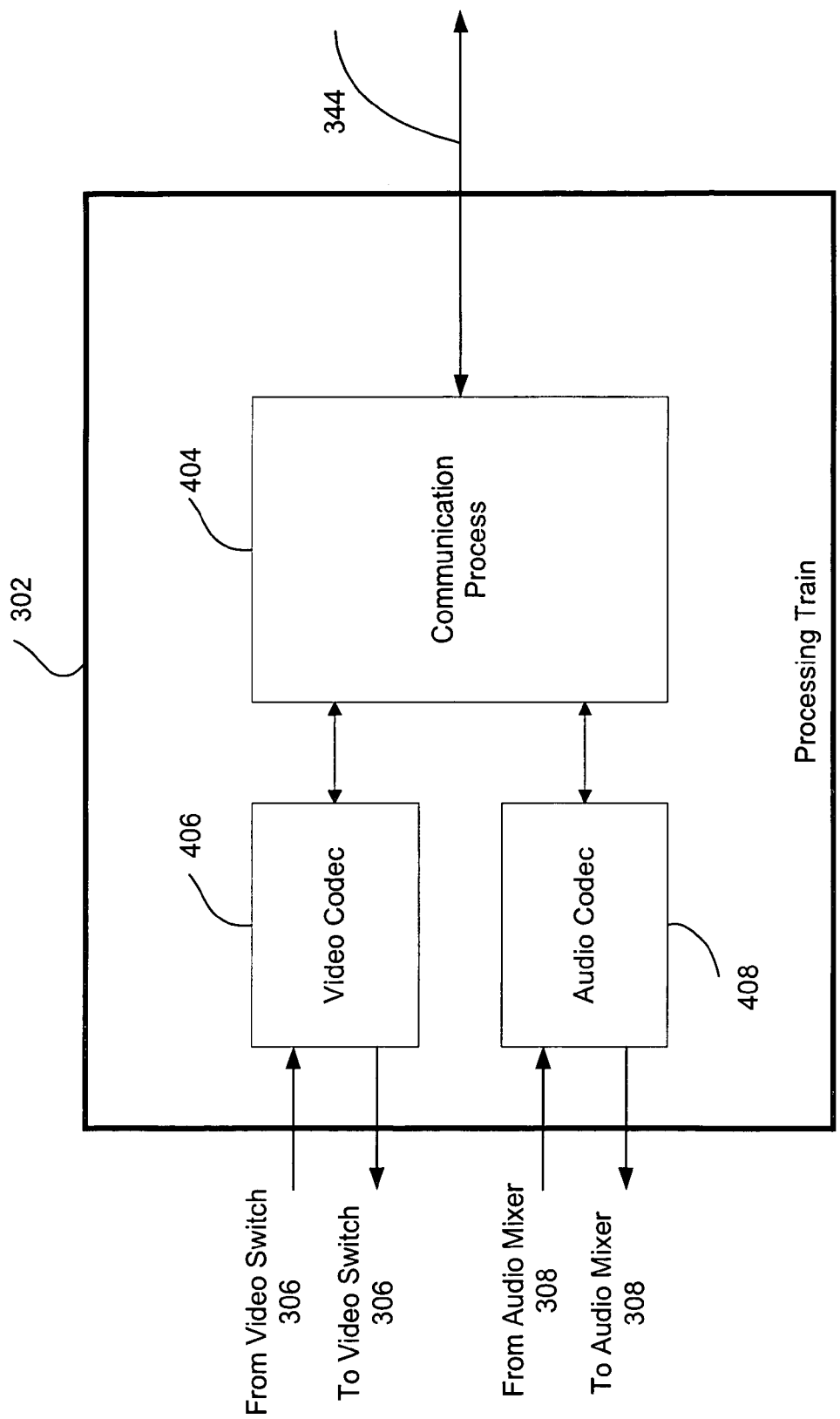
FIG. 4 is a block diagram of an exemplary signal processing train of FIG. 3.

FIG. 4 depicts components of an exemplary processing train 302. Processing train 302 includes a communication process 404 and video and audio codecs 406 and 408. In the receive mode, the combined data stream 344 is directed to communication process 404 which carries out a predetermined set of functions with respect to data stream 344.

According to one embodiment of the invention, communication process 404 implements the multiplexing, delay compensation and signaling functions set forth in ITU Recommendation H.320 ("Narrow-Band Visual Telephone Systems and Terminal Equipment"). In particular, communication process 404 includes a multiplexer/demultiplexer for (in the receive mode) extracting separate audio and video signals from mixed data stream 344 in accordance with ITU Recommendation H.221. Communication process 404 may further include a delay compensation process for inducing a delay in the audio data path in order to maintain lip synchronization. A system control unit is incorporated into communication process 404 and is configured to establish a common mode of operation with remote conference endpoint 102 in accordance with ITU Recommendation H.242.

Audio codec 408 receives the audio data stream from communication process 404 and applies redundancy reduction decoding in accordance with a standard (e.g., ITU Recommendation G.711) or proprietary audio compression algorithm. The decoded audio data stream is then sent to audio mixing module 308, as described above. Similarly, video codec 406 receives the video data stream and applies redundancy reduction decoding in accordance with a standard (e.g., ITU Recommendation H.261) or proprietary video compression algorithm. The decoded video data stream is subsequently sent to video switching/continuous presence module 306 for combination with video data generated by remote conference endpoint 104 and near conference endpoint 100, as described above in connection with FIG. 3.

In the transmit mode, video codec 406 encodes the video data stream output by video switching/continuous presence module 306 (representative, for example, of a "continuous presence" image) using a standard or proprietary video compression algorithm (e.g., H.261) and delivers the encoded video data to communication process 404. Audio codec 408 encodes the audio data stream output by audio mixing module 308 (representative, for example, of the blended speech of conference participants located at near conference endpoint 100 and remote conference endpoints 102 and 104) using a standard or proprietary audio compression algorithm (e.g., G.711) and delivers the encoded audio data to communication process 404.

Communication process 404 multiplexes the encoded audio and video data streams into a single audio/video data stream 344 of relatively high-bandwidth. The audio/video data stream is conveyed to circuit switch 350, which breaks up and distributes the high-bandwidth audio/video data signal over plural ISDN channels as further described hereinbelow.

It is noted that, while not depicted in the Figures, processing train 302 may include a data codec for coding and encoding still images and the like received from or transmitted to remote conference endpoints 102 and 104.

Figure 5:
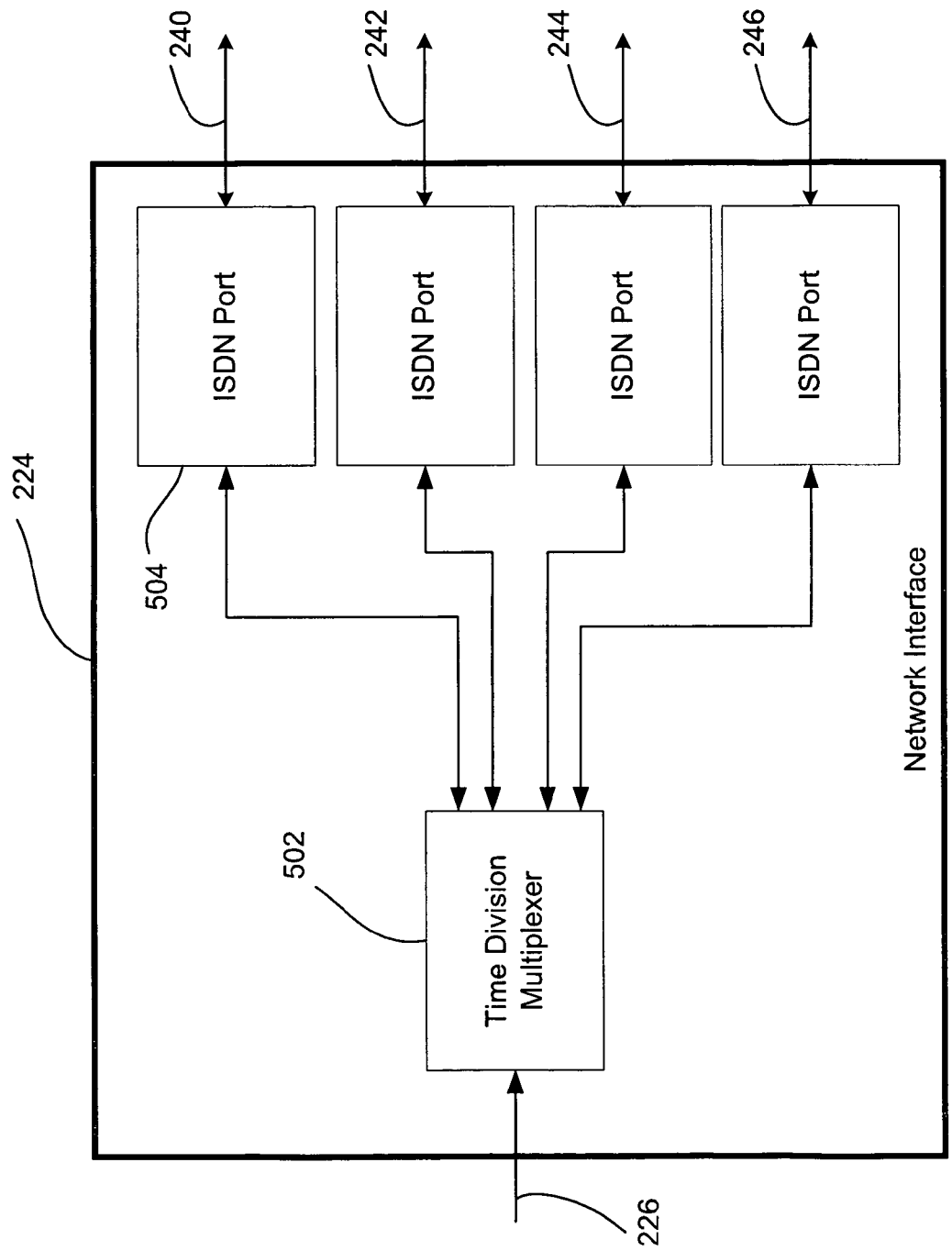
FIG. 5 is a block diagram of an exemplary network interface.

With reference to FIG. 5 the network interface 224 includes a time division multiplexer 502 which receives the wideband data stream 226 from the circuit switch 350. The time division multiplexer 502 is coupled to a plurality of ISDN ports 504 for receiving and transmitting signals on lines 240, 242, 244, and 246.

The present invention advantageously utilizes software-based processing of video and audio data streams to implement a multi-point conferencing capability in a conference endpoint. By dynamically generating a separate instance of a processing train for each remote endpoint session, a videoconferencing system embodying the invention may easily and flexibly accommodate endpoint sessions comprising a range of connection bandwidths and communication protocols. Other advantages will occur to those of ordinary skill upon review of the foregoing description and the associated figures.

It is to be understood that the detailed description set forth above is provided by way of example only. Various details of design, implementation or mode of operation may be modified without departing from the true spirit and scope of the invention, which is not limited to the preferred embodiments discussed in the description, but instead is set forth in the following claims.

What is claimed is:

1. A method for conducting a conference between a near conference endpoint and a plurality of remote conference endpoints connected for communication by a network, comprising the steps of:
   at the near conference endpoint:
   generating local audio and video signals;
   receiving audio and video signals from the plurality of remote conference endpoints;
   creating a plurality of processing trains for processing the received signals, each processing train uniquely corresponding to one of the plurality of remote conference endpoints;
   processing the received audio and video signals;
   combining the processed audio and video signals with the local audio and video signals; and
   transmitting the combined audio and video signals to each of the plurality of remote conference endpoints.

2. The method of claim 1, wherein the step of creating a plurality of processing trains includes creating a communication process and a set of codecs.

3. The method of claim 1, wherein the step of combining the processed audio and video signals is performed using an audio mixer and a video switching module.

4. The method of claim 1 further comprising providing a circuit switch for instantiating the plurality of processing trains, the circuit switch including dynamically allocable inverse multiplexers.

5. The method of claim 3, wherein the video switching module is selectively operable in a continuous presence mode, wherein images corresponding to each of the plurality of conference endpoints are displayed in separate areas of a composite image.

6. A multi-point capable video conferencing endpoint comprising:
   a network interface for receiving remote audio and video data from a plurality of remote endpoints through a network;
   an audio interface for receiving local audio data from a local source;
   a video interface for receiving local video data from a local source; and
   a CPU programmed to control receipt of the remote audio and video data, receipt of the local audio and video data; combination of the remote audio and video data with the local audio and video data; and transmission of the combined audio and video data to each of the plurality of remote endpoints through the network, wherein the CPU is further programmed to instantiate a plurality of processing trains corresponding to the plurality of remote endpoints, wherein each processing train receives the audio and video data from a single remote endpoint.

7. The multi-point capable video conferencing endpoint of claim 6, wherein each processing train comprises:
   a communication process for sending and receiving the audio and video data to and from a single remote endpoint;
   a video codec in communication with the communication process for encoding the sent video data and decoding the received video data; and
   an audio codec in communication with the communication process for encoding the sent audio data and decoding the received audio data.

8. The multi-point capable video conferencing endpoint of claim 7, further comprising:
   a video switching module in communication with each of the plurality of processing trains and the video interface for combining the local video data with the remote video data; and
   an audio mixing module in communication with each of the plurality of processing trains and the audio interface for combining the local audio data with the remote audio data.

9. The multi-point capable video conferencing endpoint of claim 6, wherein the network interface comprises a plurality of ISDN ports corresponding to the plurality of remote endpoints.

10. The multi-point capable video conferencing endpoint of claim 6, wherein the network interface comprises an Ethernet connection.

* * * * *